(12) United States Patent
Jitsuno et al.

(10) Patent No.: US 7,121,735 B2
(45) Date of Patent: Oct. 17, 2006

(54) OPTICAL FIBER CONNECTOR, METHOD FOR MANUFACTURING THE SAME, AND OPTICAL COUPLING APPARATUS

(75) Inventors: Takahisa Jitsuno, 5-5-19-304, Onoharahigashi, Minoo-shi, Osaka 562-0031 (JP); Keiu Tokumura, Osaka (JP)

(73) Assignees: Japan Science and Technology Agency, Kawaguchi (JP); Takahisa Jitsuno, Osaka (JP); Nalux Co., Ltd., Osaka (JP)

( * ) Notice: Subject to any disclaimer, the term of this patent is extended or adjusted under 35 U.S.C. 154(b) by 0 days.

(21) Appl. No.: 10/520,812

(22) PCT Filed: Jul. 7, 2003

(86) PCT No.: PCT/JP03/08583

§ 371 (c)(1),
(2), (4) Date: Jan. 7, 2005

(87) PCT Pub. No.: WO2004/005990

PCT Pub. Date: Jan. 15, 2004

(65) Prior Publication Data

US 2005/0238293 A1 Oct. 27, 2005

(30) Foreign Application Priority Data

Jul. 8, 2002 (JP) ............................ 2002-199124

(51) Int. Cl.
*G02B 6/36* (2006.01)
(52) U.S. Cl. ............................ 385/79; 385/33; 385/147
(58) Field of Classification Search .................. 385/14, 385/24, 31, 37, 39, 33, 74, 79, 88, 93
See application file for complete search history.

(56) References Cited

U.S. PATENT DOCUMENTS

| | | | | |
|---|---|---|---|---|
| 4,513,291 A | * | 4/1985 | Drabowitch | 343/771 |
| 4,634,214 A | * | 1/1987 | Cannon et al. | 385/86 |
| 4,779,947 A | * | 10/1988 | Ito | 385/93 |
| 5,017,893 A | * | 5/1991 | Izumi et al. | 332/103 |
| 5,173,714 A | * | 12/1992 | Arimura et al. | 343/771 |
| 5,457,759 A | | 10/1995 | Kalonji et al. | |
| 5,699,466 A | * | 12/1997 | Uchida et al. | 385/80 |
| 5,831,583 A | * | 11/1998 | Lagerstedt et al. | 343/771 |
| 6,069,543 A | * | 5/2000 | Ishikawa et al. | 333/219.1 |
| 6,100,703 A | * | 8/2000 | Davidov et al. | 324/631 |
| 6,406,196 B1 | * | 6/2002 | Uno et al. | 385/89 |
| 6,445,845 B1 | * | 9/2002 | Sakata et al. | 385/18 |
| 2004/0150829 A1 | * | 8/2004 | Koch et al. | 356/477 |

FOREIGN PATENT DOCUMENTS

| | | |
|---|---|---|
| EP | 1 091 226 A1 | 4/2001 |
| JP | 50-46344 | 4/1975 |
| JP | 05-053162 A | 3/1993 |
| JP | 09-015448 A | 1/1997 |
| JP | 2001-147345 A | 5/2001 |
| JP | 2002-023015 A | 1/2002 |
| JP | 2002-040271 A | 2/2002 |
| JP | 040271 A * | 2/2002 |
| JP | 2002-187139 A | 7/2002 |

* cited by examiner

*Primary Examiner*—Akm Enayet Ullah
(74) *Attorney, Agent, or Firm*—Harness, Dickey & Pierce, P.L.C.

(57) ABSTRACT

An optical fiber connector (19) has a connector main body including a first pipe (20) for receiving a fiber (24) inside, and three second pipes (21a) through (21c) for receiving the first pipe (20) inside. With this arrangement, the fiber (24) can be securely held with ease at the center of the connector main body. On this account, it is possible to provide the optical fiber connector (19) in which the fiber (24) is securely held with ease at the center of the connector main body.

18 Claims, 4 Drawing Sheets

UV ⇩

UV ⇩

OPTICAL FIBER CONNECTOR, METHOD FOR MANUFACTURING THE SAME, AND OPTICAL COUPLING APPARATUS

TECHNICAL FIELD

The present invention relates to an optical fiber connector, to a manufacturing method thereof, and to an optical coupling apparatus. The present invention particularly relates to an optical fiber connector by which a fiber can be held at the center of the optical fiber connector, and to a manufacturing method thereof, and an optical coupling apparatus using the optical fiber connector.

BACKGROUND ART

In recent years, a glass optical fiber of a Single-Mode type (SM type) has been widely used for a long distance trunk line, for the purpose of building an information network. The SM optical fibers have a considerably small core diameter in a range of 5 µm to 10 µm. Therefore, in setting the optical fiber, it is necessary to use means for connecting or branching the optical fiber with high accuracy.

Disclosed by the inventors of the present invention in Japanese Laid-Open. Patent Publication No. 2002-23015 (published on Jan. 23, 2002) is a method for manufacturing an optical fiber connector which allows the optical fiber to be connected or branched with high accuracy by simply forming a lens surface. As illustrated in FIG. 3 an optical fiber connector 29 manufactured in accordance with the method includes a connector main body 30 having a cylindrical shape. At one end of the connector main body 30, a SM optical fiber wire 33 is placed. A fiber 34 drawn from an end of the optical fiber wire 33 is inserted in the connector main body 30. The fiber 34 is implanted in a fiber region of the connector main body 30 with a resin material 31 such as epoxy resin. Thereafter, an ultraviolet light hardened resin 32 is injected in a resin injection portion located at the leading end of the fiber 34. In this way, the optical fiber connector 29 is formed.

As described above, in this publication, a core of the fiber 34 is inserted in the connector main body 30, and the fiber 34 is implanted with the resin material 31 such as epoxy resin. However, the publication does not describe a concrete method for holding the fiber in the connector main body, i.e., a method as to how the optical axis of the fiber can be held at center of the connector main body. Further, because the manufacturing method does not allow the optical axis of the fiber to be held with high accuracy, the method includes the step of adjusting misalignment of the optical axis.

Further, in addition to the foregoing method, there are other methods for holding a fiber, such as a method that uses injection molding to provide a shape that fits the implanted fiber, and a method in which a zirconia ferrule is passed through a pipe. However, these methods have problems in that the former requires a mold for the implantation of the fiber in the connector main body, and that the latter uses expensive zirconia ferrule.

As such, regardless of the type of conventional methods used to insert the fiber in the connector main body, it is very difficult to hold the fiber at the center of the connector while easily and accurately holding the optical axis. Accordingly, in addition to the additional manufacturing step required to correct the optical axis as described above, the procedure is complicated and requires a considerable amount of time. Further, misalignment of the fiber optical axis can cause coupling loss. Therefore, for reduction or prevention of the coupling loss, it is very important to hold the fiber at the center of the connector main body with high accuracy.

Incidentally, optical fiber connectors are connected to each other by aligning the respective ends of the connectors with high accuracy by using a split sleeve or the like. For example, conventional FC connectors are connected to each other by placing a pair of ferrules opposite each other in a sleeve, with the optical fibers held and fixed at the respective centers of the ferrules. The ferrules are then aligned in a straight line to couple the connectors.

Further, in an E/O (electric/optical) or O/E (optical/electric) converter (i.e., optical network unit (ONU)), the fiber is connected to an ONU device by aligning the two using precision components. For example, in the electric/optical conversion, coupling is made by converging emitted light of a semiconductor laser (LD) through a light converging member such as a ball lens placed between the semiconductor laser and the fiber, so as to accurately align the semiconductor laser and an end face of the fiber. Moreover, there is also a method in which the semiconductor laser and the fiber are connected with high accuracy by drawing the fiber to a vicinity of an end face of the semiconductor laser.

However, these connecting methods require precision components, and accurate alignment requires proficiency. Therefore, the operation is impractical. This has caused the conventional optical fiber to be expensive.

The present invention was made in light of the conventional problems, and one of its objects is to provide (i) an optical fiber connector in which an optical axis of the optical fiber can be easily held at the center of the optical fiber connector with high accuracy, and (ii) a manufacturing method thereof, and (iii) a use thereof. Another object is to provide (i) an optical fiber connector that allows for easy and accurate alignment of optical axes, (ii) a manufacturing method thereof, and (iii) a use thereof.

DISCLOSURE OF INVENTION

The present inventors diligently studied a method for holding a fiber at the center of a connector main body, whereby the optical axis of the fiber is not displaced from the center. As a result, the present inventors found a way to accurately hold the fiber at the center of the connector main body without misaligning the optical axis. This was achieved by constructing the connector main body by combining a plurality of metal pipes with one another, instead of implanting the fiber in resin filling the connector main body as conventionally done. In this way, the present invention was accomplished.

Namely, to achieve the objects, an optical fiber connector, of the present invention, in which a lens is formed at a resin injection portion located at a front end of an optical fiber inserted in a connector main body, wherein the connector main body includes a first pipe for receiving the optical fiber inside, and a second pipe for receiving the first pipe inside, wherein the lens surface is formed by a dead weight and a surface tension of resin, and wherein the lens is shaped taking into account a positioning error of the optical fiber with respect to an outer diameter of the connector.

According to the invention, the connector main body includes the first pipe for receiving the optical fiber inside, and the second pipe for receiving the first pipe inside. Therefore, the present invention allows the optical fiber to be securely held with ease at the center of the optical fiber connector. Namely, the optical axis of the optical fiber can be aligned with high accuracy. On this account, the optical axis of the optical fiber will not be misaligned, thereby preventing coupling loss of the connector.

It is preferable in the optical fiber connector of the present invention that the connector main body be made of stainless steel.

The optical fiber connector made of a relatively hard metal such as stainless steel is stronger in mechanical strength than the conventional optical fiber connector made of resin. Therefore, in the case where both the first pipe and the second pipe are made of stainless steel, the mechanical strength of the optical fiber connector further increases. For example, in the case where the optical fiber connectors of the present invention are coupled to form an optical fiber coupler, frictional wear does not occur between the optical fiber connectors when attaching or detaching the optical fiber connectors.

Further, the connector main body made up of metal pipes can suppress bubbles that occur during lens formation, as compared with the connector main body made of resin. Thus, in this way, volume shrinkage of the resin caused by bubbles can be prevented. Therefore, it is possible to easily control a lens shape with high accuracy. On this account, it is possible to manufacture an optical fiber connector having improved light converging properties.

It is preferable in the optical fiber connector of the present invention that the lens is made from a plurality of resins having different refractive indexes. Further, it is preferable in the optical fiber connector that a resin with the largest refractive index among the plurality of resins defines a surface of the lens.

The optical fiber connector in accordance with the present invention may be formed, for example, as follows.

To achieve the objects, a method, according to the present invention, for manufacturing an optical fiber connector in which a lens is formed at a resin injection portion located at a front end of an optical fiber inserted in a connector main body, the method comprising: a connector forming step of forming the connector main body by inserting a first pipe in a second pipe, wherein the first pipe receives the optical fiber inside, and the second pipe receives the first pipe inside; a fiber inserting step of inserting the optical fiber in the first pipe of the connector main body formed in the connector forming step; and a lens forming step of forming a lens by injecting a light-hardened resin or a thermosetting resin in the resin injection portion.

According to the steps, the connector main body is formed by inserting the first pipe in the second pipe before or after the optical fiber is inserted in the first pipe. This ensures that the optical fiber is held at the center of the connector main body. In other words, the optical axis of the optical fiber can be aligned at the center of the connector main body with high accuracy. Accordingly, because the optical axis of the optical fiber is not misaligned, coupling loss of the connector is prevented. Further, it is not necessary for the method to further include the step of adjusting the optical axis of the lens. This reduces the number of manufacturing steps from conventional methods. Therefore, the optical fiber connector can be manufactured more conveniently.

It is preferable in the method that the lens forming step includes: a first resin injecting and hardening step of injecting a first resin, made from a light-hardened resin or a thermosetting resin, into the resin injection portion, and hardening the first resin; a second resin injecting step of injecting a second resin, made from a light-hardened resin or a thermosetting resin, onto the hardened first resin so as to form a pre-fens; and a second resin hardening step of hardening the second resin so as to form the lens.

According to the steps, after the first resin, which is light hardened resin or thermosetting resin is injected into the resin-injection portion and is hardened, the second resin, which is light hardened resin or thermo setting resin is further injected onto the hardened first resin. That is, the lens composed of the first resin and the second resin is formed through a process in which two kinds of resins are injected stepwise to inject and harden the resins separately. In this way, it is possible to reduce the adverse effect of volume shrinkage caused when the resins are hardened. Therefore, it is possible to control a lens shape both easily and accurately. As a result, it is possible to produce the lens with improved light converging property.

It is preferable in the method that the second resin has a higher refractive index than the first resin.

According to the present invention, the light is refracted as it passes through the first resin having a lower refractive index, and the second resin having a higher refractive index. Therefore, in the case where the second resin which corresponds to the lens surface has a greater refractive index, it is possible to reduce the wavefront aberration. As a result, it is possible to obtain a superior light converging property. As described above, the refractive index of the second resin is larger than the refractive index of the first resin. Another way of saying this is that the first resin and the second resin are different. As above, in the case where the lens is formed by using two kinds of resins whose refractive indexes are different from each other, it is possible to further reduce the volume shrinkage and improve the light converging property.

Further, it is preferable that the first resin and the second resin are ultraviolet-hardened resins, and are hardened by irradiation of ultraviolet light.

In the case where the light hardening resin such as the ultraviolet hardened resin is used as the first resin and the second resin, it is possible to harden the resin only by irradiating ultraviolet (UV) light onto the ultraviolet hardened resin injected into the resin-injection portion. That is, in the case where the ultraviolet hardened resin is used, it is unnecessary to heat the resin to harden it after irradiation of UV light. Therefore, it is possible to simplify manufacturing steps as compared with the case that the thermosetting resin is used.

It is preferable in the second resin hardening step that, in said second resin hardening step, the wavefront aberration of light that has transmitted through the pre-lens is measured, wherein the lens is so shaped as to have a wavefront aberration close to 0, taking into account a positioning error of the optical fiber with respect to an outer diameter of the connector, and wherein a lens surface is formed by a dead weight and a surface tension of the second resin.

According to the invention, in the second resin hardening step, the second resin is hardened into a shape that will bring the wavefront aberration of transmitted light through the pre-lens to be close to 0. In this way, as described above, the adverse effect of the volume shrinkage can be decreased. Therefore, unlike the conventional examples, it is possible to harden the second resin without taking into account the volume shrinkage beforehand.

An optical connecting apparatus of the present invention includes (i) a light source or optical information output means for outputting optical information; (ii) an optical fiber connector as set forth in any one of claim 1 through 4 for optically coupling with emitted light from the light source or the optical information output means; and (iii) setting means having a groove for setting the optical fiber connector and the light source or the optical information output means thereon.

According to the invention, because the optical fiber connector of the present invention is used, optical axes of (i) the optical fiber and (ii) the light source or the optical information output means can be matched by only placing them on the groove of the setting means. This realizes easy and accurate optical coupling.

For a fuller understanding of the nature and advantages of the invention, reference should be made to the ensuing detailed description taken in conjunction with the accompanying drawings.

BEST MODE FOR CARRYING OUT THE INVENTION

The following description deals with one embodiment of the present invention with reference to FIG. 1, FIG. 2(a) through FIG. 2(e), FIG. 4 and FIG. 5. Note that the present invention is not limited to the following descriptions.

1. An Optical Fiber Connector of the Present Invention.

An optical fiber connector of the present invention includes: (i) a connector main body having a first pipe for receiving an optical fiber inside, and a second pipe for receiving the first pipe inside; and (ii) a collimator lens formed by injecting and hardening a resin in a resin injection portion at a front end of the optical fiber. The collimator lens causes emitted light of the optical fiber to be parallel light.

Figure 1:
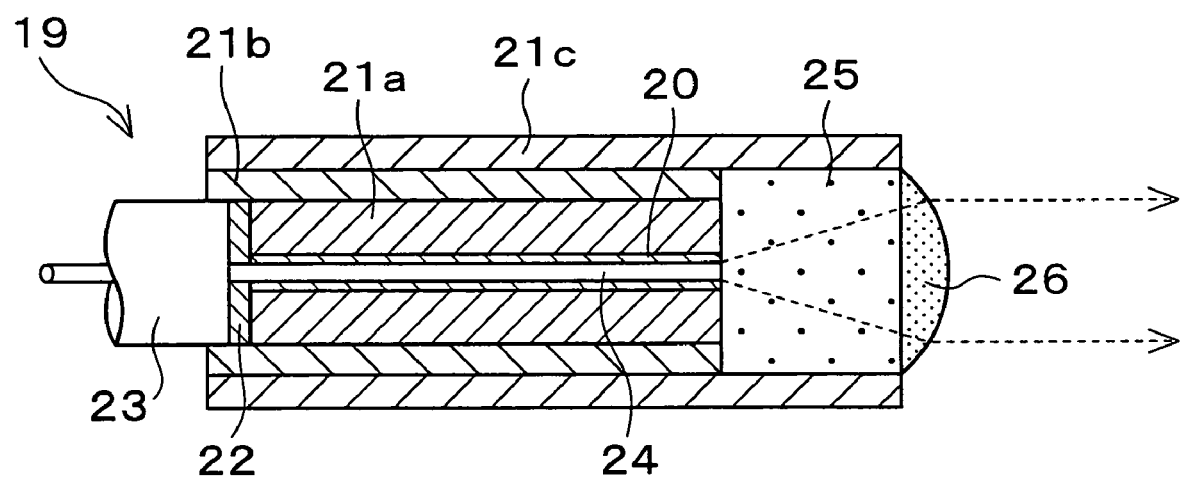
FIG. 1 is a cross sectional view illustrating an optical fiber connector of one embodiment of the present invention.

Specifically, as shown in FIG. 1, an optical fiber connector 19 includes a connector main body having (i) a first pipe 20, and (ii) second pipes 21a through 21c for receiving the first pipe 20 inside. The connector main body has one end in which an end portion of an optical fiber wire 23 is disposed. A fiber 24 extends out of the end portion of the optical fiber wire 23, and is inserted in the first pipe 20. In the optical fiber connector 19 shown in FIG. 1, the first pipe 20 is combined with the second pipes 21a through 21c in such a manner that the first pipe 20 is at the center of the connector main body. Note that the fiber 23, the first pipe 20, and the second pipes 21a through 21c are fixed in position by being bonded with a resin material 22 such as an ultraviolet-hardened resin. Note also that, instead of using the resin material 22, the respective pipes may be fixed in position by caulking.

On the other end of the connector main body is the collimator lens. The collimator lens is made from a first resin 25 and a second resin 26. The first resin 25 is so filled as to make contact with a front end surface of the fiber 24 of the optical fiber wire 23. A surface of the collimator lens (i.e., a surface of the second resin) is a lens surface. The lens surface allows emitted light from the front end of the fiber 24 of the optical fiber wire 23 to be parallel light (fiber collimated light) as indicated by broken line arrows in FIG. 1.

An optical fiber connector according to the present invention ensures that the fiber 24 is always inserted at the center of the connector main body. On this account, the optical fiber and the optical fiber connector can be accurately connected to each other without misaligning their optical axes.

Note that the optical fiber connector shown in FIG. 1 is arranged so that the connector main body is constructed by the four metal pipes; however, the present invention is not limited to this. It is possible to suitably change the number, length or other dimensions of the metal pipes.

Further, material of the metal pipes for the connector main body is not particularly limited. For example, copper, aluminum, zinc, a metal alloy such as SUS (stainless steel) and brass may be used. Further, in the case where the metal pipes are made of a hard material such as SUS, an optical fiber coupler combining optical fiber connectors of the present invention undergoes less frictional wear when it is detached or attached. On the other hand, in the case where the optical fiber connector is made of a relatively soft material such as copper or brass, the optical fiber connector can be processed with ease. Note that, in Examples below, metal pipes made of SUS are used for the connector main body.

Further, the external diameter of the first pipe is not particularly limited as long as the fiber can be inserted therein; however, it is preferable that the external diameter of the first pipe be similar to the diameter of the fiber to be inserted. In the case where the internal diameter of the first pipe is similar to the diameter of the fiber, the fiber can be held at the center of the connector main body with better accuracy. For example, Examples below uses a syringe needle having an internal diameter of 130 μm as the first pipe. Because the syringe needle has substantially the same diameter as the optical fiber, the needle can be suitably used as the first pipe. Further, the syringe needle is readily available.

Further, the internal diameter of the second pipe for receiving the first pipe is not particular limited. However, it is preferable that the internal diameter of the second pipe be substantially the same as that of the first pipe to be inserted in the second pipe. This ensures that the fiber is securely held at the center of the connector main body.

Further, the external diameter of the connector main body made up of the first pipe and the second pipe is not particularly limited. However, because a common connector has a diameter of 2.5 mm, it is preferable that the external diameter of the connector main body be close to 2.5 mm. For example, it is preferable to use a stainless-steel pipe having an external diameter of 2.4 mm, because it is readily available.

Note that FIG. 1 illustrates the optical fiber connector whose connector main body is made up of metal pipes as a whole; however, the connector main body may be arranged so that at least the first pipe for receiving the optical fiber inside is a metal pipe. In this case, other members constituting the connector main body are not particularly limited to the metal pipe, as long as the optical fiber inserted in the first pipe is held at the center of the connector main body. For example, these members may be made of (i) a metal that is not in the form of a pipe, (ii) a resin, or the like. However, the connector main body made up of only metal pipes as described above has following advantages (1) through (4):

(1) A metal pipe is readily available, and is low-cost.

(2) It is easy to process a metal pipe. For example, a metal pipe can easily be cut into an adequate length.

(3) A metal pipe allows for reduction of bubbles occurring during lens formation.

(4) When constructing an optical fiber coupler, frictional wear is prevented.

As such, the connector main body made of metal can prevent bubbles that occur during lens formation, as compared with a connector main body made of resin. Further, with the connector main body made of metal, the mechanical strength of the optical fiber connector can be improved. Further, the connector main body made of metal does not need a mold, which is required for forming a connector main body made of resin.

One possible reason the metal connector main body allows for reduction of bubbles as compared with the resin connector main body is due to a difference in surface tension (wettability) between metal and resin. Specifically, by comparing surface tension of metal with that of resin, metal has a smaller surface tension than resin. Therefore, the poor wettability of the conventional connector main body made of resin easily causes bubbles when the resin is injected to form the lens. On the other hand, with good wettability, the connecter main body made of metal generates fewer bubbles when the resin is injected to form the lens.

Note that characteristics of the parallel light (fiber collimated light) change according to a lens curvature, a lens length, a refractive index of the resin, and a beam diameter of the collimated light, as described later.

2. A Method for Manufacturing an Optical Fiber Connector According to the Present Invention A method for manufacturing an optical fiber connector according to the present invention includes the steps of: (a) forming the connector main body by inserting a first pipe, for receiving the optical fiber inside, in a second pipe for receiving the first pipe inside (connector forming step); (b) inserting the optical fiber in the first pipe of the connector main body formed in step (a) (fiber inserting step); and (c) forming a lens by injecting a light-hardened resin or a thermosetting resin in the resin injection portion (lens forming step).

The following will describe the respective steps (a) through (c).

(a) Connector Forming Step

Firstly, formation of the connector main body is explained with reference to FIG. 2(a). In the present embodiment, the connector main body is constructed from (i) the first pipe 20 for receiving the fiber 24 of the optical fiber wire 23 inside; and (ii) the three second pipes 21a through 21c for receiving the first pipe 20 inside. The first pipe 20 and the second pipes 21a through 21c may be fixed to one another with the resin material 22 or by caulking them from outside.

The connector main body is constructed in this manner by combining the first pipe with the second pipes in a symmetrical manner.

Note that the manner in which the first pipe is combined with the second pipes is not particularly limited, as long as the first pipe is at the center of the connector main body when the connector main body is formed.

(b) Fiber Inserting Step

Next, the fiber 24 is inserted in the first pipe of the connector main body formed in connector forming step (a). As described above, the first pipe 20 and the second pipes 21a through 21c are so combined that the first pipe 20 is disposed at the center of the connector main body. This ensures that the fiber 24 is securely held with ease at the center of the connector main body. Accordingly, the optical axis of the fiber 24 will not be displaced from the center. Therefore, unlike the conventional techniques, there is no need to perform a step of correcting misalignment of the optical axis of the fiber 24 in the subsequent steps.

In steps (a) through (b), the fiber 24 is inserted in the first pipe 20 after the connector main body is formed by combining the first pipe 20 and the second pipes 21a through 21c together. However, it should be noted that the connector main body may be formed by firstly inserting the fiber 24 in the first pipe 20, and then combining the first pipe 20 with the second pipes 21a through 21c in a symmetrical manner, with the fiber 24 inserted in the first pipe 20. Namely, the connector main body may be formed after the fiber is inserted in the first pipe.

(c) Lens Forming Step

Next, a lens is formed in a resin injection portion 27 shown in FIG. 2(a) by injecting a light-hardened resin or a thermosetting resin. In the present embodiment, the lens forming step includes the steps of: (i) injecting a first resin, which may be a light-hardened resin or thermosetting resin, into the resin injection portion, and hardening the first resin; (ii) forming a pre-lens by injecting a second resin, which may be a light-hardened resin or thermosetting resin, on the hardened first resin; and (iii) forming a lens by hardening the second resin.

(i) First Resin Injecting and Hardening Step

As shown in FIG. 2(b), with a resin injector 30 such as a syringe, the first resin 25 is injected into the resin injection portion 27 occupying the space from the front end of the connector main body to the end of extension of the fiber 24.

Next, as shown in FIG. 2(c), the first resin 26 is hardened by irradiation of light or application of heat (FIG. 2(c) shows an example of UV irradiation). Note that an injected amount of the first resin 25 is not particularly limited, and a suitable amount of the first resin 25 may be injected. Further, because hardening conditions of the first resin 25 depend on what kind of resin is used as the first resin 25, the hardening conditions of the first resin 25 may be suitably set.

The first resin 25 may be, for example, a light-hardened resin such as UV-hardened resin, or a thermosetting resin. Here, the "light-hardened resin" indicates a resin having such a property as to be hardened by irradiation of light. Further, the "UV-hardened resin" indicates a resin having such a property as to be hardened by ultraviolet (UV) irradiation. The light-hardened resin can be produced by adding a photo polymerization initiator to a monomer of acrylate compound, epoxy compound, or the like. In the case of an acrylate compound, the photo polymerization initiator may be a radical-generating compound such as benzoin, benzophenone, or the like. In the case of an epoxy compound, the photo polymerization initiator, may be an onium salt such as allyldiazonium, chloroborate salt, or the like.

In the case where the first resin is the light-hardened resin such as a UV-hardened resin, there is no need to apply heat for hardening the first resin 25 after the UV irradiation. Therefore, in this case, the manufacturing steps can be simpler than the case where the thermosetting resin is used as the first resin 25.

Further, when the thermosetting resin is used as the first resin 25, use of metal pipes, for example, for the connector main body is more preferable than using resin because metal provides better heat-conductivity than resin. Therefore, with the connector main body made of metal, the resin can be hardened more easily, as compared with the connector main body made of resin.

The first resin 25 may have fluidity so that the first resin 25 can be injected in a narrow and small space. With such a property, the first resin 26 can be prevented from falling from the resin injection portion 29 even when the first resin 26 is injected into the resin injection portion 27 with the resin injection opening of the resin injection portion 27 facing downward (i.e., the first resin 26 is injected in the opposite direction of that shown in FIG. 1).

ii) Second Resin Injecting Step

Figure 2:
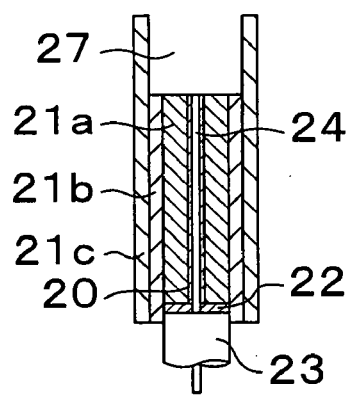
FIG. 2(a) through FIG. 2(e) are schematic diagrams illustrating a method for manufacturing the optical fiber connector according to the present invention.
Figure 2:
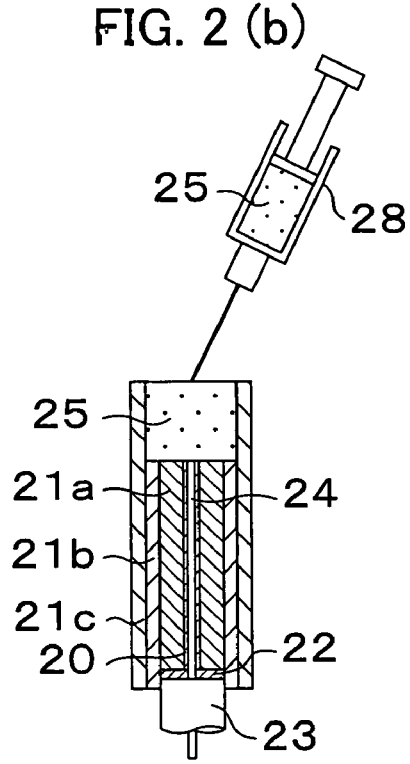
Figure 2:
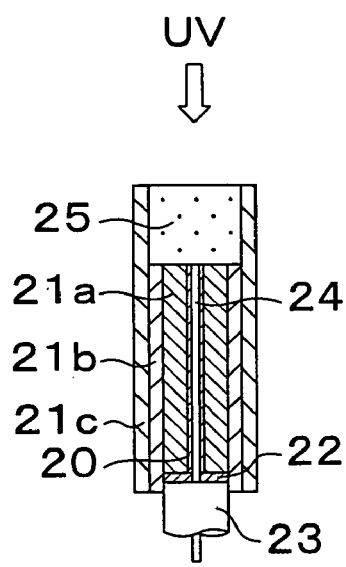
Figure 2:
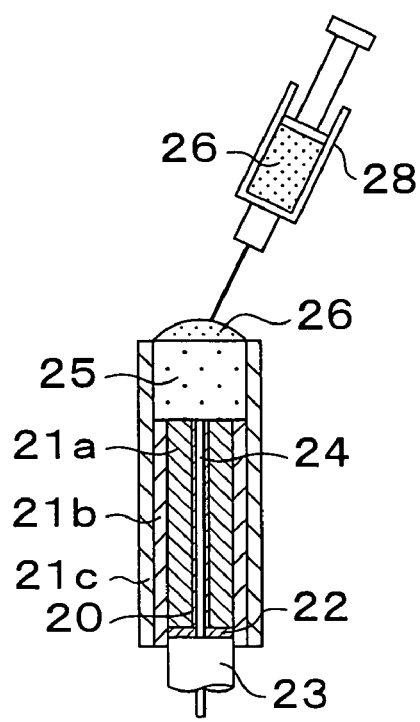
Figure 2:
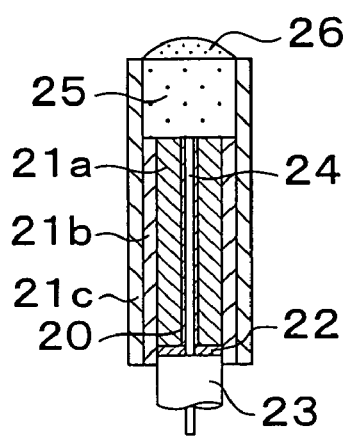
Figure 3:
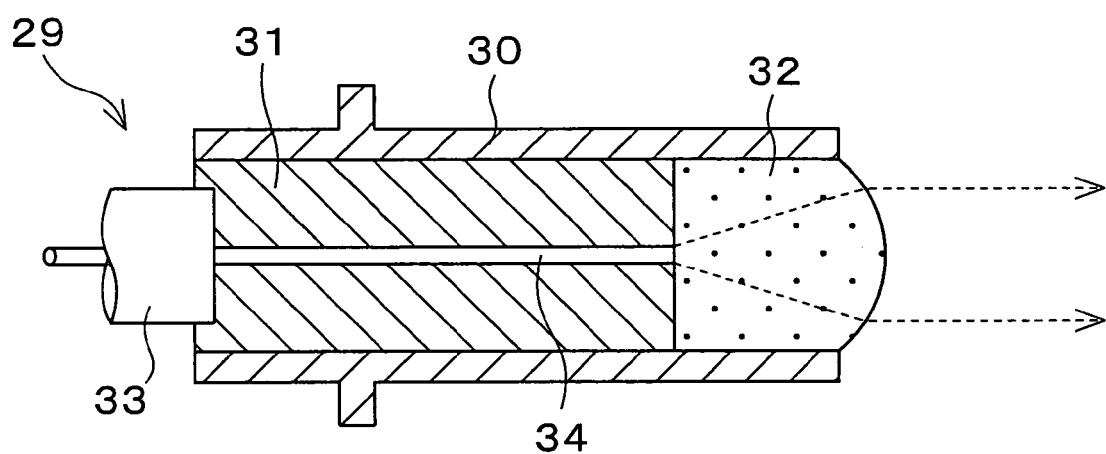
FIG. 3 is a cross sectional view illustrating an optical fiber connector that the inventors of the present invention proposed.

Next, the pre-lens is formed by injecting the second resin 26 on the first resin 25 by using a resin injector 28 as shown in FIG. 2(*d*). Namely, the pre-lens is formed from the first resin 25 and the second resin 26. Moreover, the surface of the pre-lens, that is, the surface of the second resin 26 corresponds to the lens surface. Note that FIG. 2(*e*) shows a definite boundary between the first resin 25 and the second resin 26; however, there is substantially no interface between the two since the compositions of these resins do not differ greatly.

The second resin 26 is injected on the second resin 26 past the end of the connector main body (i.e., height of the resin injection portion 27). In this way, the second resin 26, with its dead weight and surface tension, forms a convex surface, thereby forming the pre-lens.

In this manner, the first resin 25 and the second resin 26 constitute the collimator lens. The lens length of the collimator lens is from the first resin 25 to the surface (lens surface) of the second resin 26. Therefore, the lens length depends on the injected amounts of the first resin 25 and the second resin 26.

Note that the second resin 26 may be a light-hardened resin or a thermosetting resin, like the first resin 25. As described above, in the case where the ultraviolet hardened resin is used as the second resin, the manufacturing steps can be simpler than the case that the thermosetting resin is used. Further, in the case where the thermosetting resin is used, heat conductivity can be improved when the connector main body is made of metal. Therefore, with the connector main body made of metal, the resin can be hardened more easily, as compared with the connector main body made of resin.

Here, it is preferable that there be a large difference between the refractive index of the first resin 25 and that of the second resin 26. Further, it is more preferable that the second resin 26 have a larger refractive index than the first resin 25. The surface of the second resin 26 corresponds to the lens surface, and the emitted light from the fiber 24 is refracted as it passes through the first resin 25 having a lower refractive index and the second resin 26 having a higher refractive index. The passage of light from a medium of a smaller refractive index to a medium of a greater refractive index is advantageous in refracting and converging the light. Therefore, in the case where the second resin 26 has the larger refractive index than the first resin 25, it is possible to reduce wavefront aberration, thereby improving the light converging property. Note that the first resin 25 and the second resin 26 may contain a reagent (for example, a monomer containing a halogen compound (preferably bromine)) for increasing the refractive index.

In the case where the second resin 26 is a resin having a large surface tension, the second resin 26 forms a convex surface with a small curvature. In other words, it is possible to form a lens whose lens surface curvature is small. On the other hand, in the case where the second resin 26 is a resin having a small surface tension, the second resin 26 forms a convex surface with a large curvature. In other words, it is possible to form a lens whose lens surface curvature is large.

As described above, the second resin 26 may have fluidity so that the second resin 26 can be injected in a narrow and small space. With such a property, the second resin 26 can be prevented from falling from the resin injection portion 27 even when the second resin 26 is injected into the resin injection portion 27 with the resin injection opening of the resin injection portion 27 facing downward.

iii) Second Resin Hardening Step

Next, the lens surface (surface of the second resin 27) and thereby the lens are formed by hardening the second resin 27 while measuring wavefront aberration of light transmitting through the pre-lens formed in step ii) above. The wavefront aberration may be measured in accordance with a well-known measuring method, for example, with the use of a Shack-Hartmann wavefront measuring instrument. In principle, the Shack-Hartmann wavefront measuring instrument includes a lens array, a camera, and the like. The lens array is provided with a plurality of micro lenses. The camera is used for recording respective focusing positions of measured light focused through the micro lenses of the lens array. For the micro lenses, those having a high spatial resolution or a wide dynamic range are selected according to a shape of a measured light beam. The lens array of the Shack-Hartmann wavefront instrument forms dot images at the respective focusing positions of the micro lenses. The focusing positions of the emitted light (measured light) are then recorded with the camera.

Here, in the Shack-Hartmann wavefront instrument, focusing positions of the micro lenses are set in advance based on reference data for a desired lens surface. A difference in focusing position between the reference data and the emitted light (measured light), i.e., disagreement of focusing positions (both magnitude and direction) corresponds to a tilt of a wavefront, allowing for measurement of a wavefront.

After performing the wavefront measurement on the pre-lens, the second resin 26 is hardened by irradiating light or applying heat according to the type of the second resin 26. As a result, the lens surface (surface of the second resin 26) is formed, and the collimator lens is prepared.

In the present embodiment, the first resin 25 and the second resin 26 constituting the lens are injected in two stages as described above. This suppresses a volume shrinkage that occurs after the resin is hardened. In this way, the shape of the lens surface will not be changed greatly by the hardening of the second resin 26. That is, it is possible to reduce a change in the curvature of the lens shape. In other words, it is possible to control the lens shape with ease. Further, because the second resin 26 is so shaped that the wavefront is close to 0, it is possible to improve the light converging property of the lens.

The optical fiber connector may be manufactured in the described manner.

In the present manufacturing method, the collimator lens is formed by utilizing the dead weights and surface tensions of the first resin and the second resin. Further, while forming the collimator lens, wavefront aberration is measured, and the optical axis is adjusted with reference to the external surface of the connector main body. On this account, it is possible to obtain the collimated light having an optical axis parallel to the external surface of the connector main body. This enables the respective optical axes of the optical fiber connectors to be matched only by placing the optical fiber connectors on a groove or the like. This ensures that the optical axes are aligned both easily and accurately.

Incidentally, accurate alignment and matching are required for the optical axes when connecting the optical fiber connectors to each other, or when connecting the optical fiber connector to an E/O (electric/optical) or O/E (optical/electric) converter (ONU). This is because misaligned optical axes prevent accurate optical coupling or accurate branching. Conventionally, the optical axes are aligned by using precision components. However, this operation requires proficiency, and it is therefore impractical.

Figure 4:
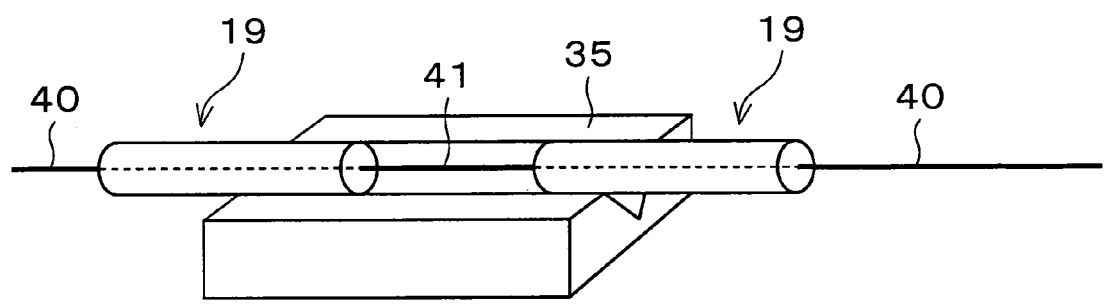
FIG. 4 is a perspective view illustrating an example in which the optical fiber connector of FIG. 1 is connected to another optical fiber connector.

In contrast, the connector main body of an optical fiber connector of the present invention is made up of the first pipe and the second pipe. This construction ensures that the optical fiber is securely held at the center of the connector main body. On this account, it is possible to connect the optical fiber connectors to each other with such high accuracy that their optical axes are not misaligned. More specifically, as shown in FIG. 4, the optical fiber connectors 19 can be connected to each other both easily and accurately only by placing two optical fiber connectors 19 on setting means 35 having a V-shaped groove or the like, with their collimator lenses facing each other. In this case, fiber light 40 of one of the optical fiber connectors 19 is converted to collimated light 41 by the collimator lens. Then, the collimated light 41 is converted back to the fiber light 40 by the collimator lens of the other optical fiber connector 19.

Figure 5:
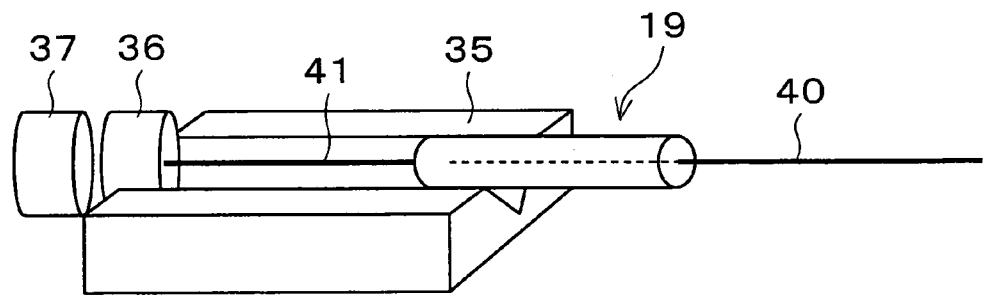
FIG. 5 is a perspective view illustrating an example in which the optical fiber of FIG. 1 is connected to a semiconductor laser.

Further, an optical fiber connector of the present invention can be used not only for the connection between optical fiber connectors but also accurately for the optical coupling with a laser beam (emitted light) from a semiconductor laser (light source), for example. More specifically, as shown in FIG. 5, a collimator lens 36 and the optical fiber connector 19 is placed on the setting means 35 in such a manner that the collimator lens 36 and the collimator lens of the optical fiber connector 19 face each other. The collimator lens 36 is used to convert a laser beam of the semiconductor laser 37 into the collimated light 41. On this account, the collimator lens 36 converts the laser beam of the semiconductor laser 37 to the collimated light 41, and the collimated light 41 is converged by the collimator lens of the optical fiber connector 19, thereby realizing optical coupling.

In this manner, the present invention realizes easy and accurate optical coupling, via collimated light, between optical fiber connectors, or between an optical fiber connector and other optical member (light source; optical information output means). Unlike the conventional techniques, an optical fiber connector of the present invention realizes accurate optical coupling without requiring alignment using precision components, or placing the optical fiber connector near the semiconductor laser. In other words, optical coupling can be realized without the conventionally required optical axis alignment using precision components.

The optical coupling shown in FIG. 4 and FIG. 5 using the optical fiber connector 19 can be described as an optical coupling apparatus for implementing the optical fiber connector 19 in actual applications. Namely, the present invention includes an optical coupling apparatus which uses the optical fiber connector for optical coupling with the output light from a light source or optical information output means. For example, the present invention includes the optical connecting apparatus as shown in FIG. 4 and FIG. 5, in which the optical fiber connector 19 is placed on the V-grooved setting means 35 together with another other optical fiber connector 19 or the semiconductor laser (light source) 37 having the collimator lens 36. As described above, the optical fiber connector 19 provides light parallel to the connector main body. Therefore, the optical axes can be matched by simply placing the optical fiber connectors 19 on the setting means having a groove. On this account, accurate optical coupling can be realized.

Note that FIG. 4 and FIG. 5 show the setting means 35 having a V-shaped groove; however, the shape etc. is not particularly limited as long as it can anchor the optical fiber connector 19 and an optical member (optical information generating means) such as the light source. Further, the structure of the setting means 35 is not particularly limited. Further, when optically connecting the optical fiber connectors to each other, their respective optical axes can be accurately matched each other only by placing the optical fiber connectors on the groove of the setting means 35. Other than the groove, the setting means 35 may include an anchorage portion for fixing positions of the optical fiber connector and the light source or the light information output means. The anchorage portion may be, for example, a stopper such as an L-shaped corner or U-shaped corner. However, in consideration of the spatial configuration of the setting means 35, it is preferable that the groove be provided on the setting means 35.

In the present embodiment, the lens is formed in two stages (two steps), using the first resin and the second resin, respectively. However, the number of stages of resin injection is not limited to two but may be greater. In this case, the resin injected lastly is hardened while measuring the wavefront aberration as described above. Further, the lens may be formed using only the first resin (one step).

Further, an optical fiber connector obtained by a manufacturing method of the present invention may be used as an optical fiber coupler for coupling optical fibers. This can be realized by combining the optical fiber connector with another optical fiber connector of substantially the same configuration. Namely, such an optical fiber coupler can be manufactured by adding an additional step to a manufacturing method of the present invention, i.e., a step of fixing a pair of optical fiber connectors to each other.

As described above, an optical fiber connector of the present invention can hold the fiber at the center of the connector main body. Therefore, the optical fiber coupler formed by coupling the optical fiber connectors allows for highly accurate connection or branching of the optical fibers.

Note that the foregoing description dealt with the optical fiber connector 19 including the collimator lens made from the first resin 25 and the second resin 27; however, the type (number) of resin used for the collimate lens is not particularly limited. Namely, an optical fiber connector of the present invention may include a collimator lens made from one or more kinds of resin. However, for improvement of the light converging property, it is preferable that the optical fiber connector include a collimator lens made from a plurality of resins (preferably, a resin with a large refractive index is used to provide the lens surface).

EXAMPLES

Hereinafter, the present invention is explained in more detail with reference to Examples. It should be noted that the present invention is not limited to the following Examples in any way.

Example 1

In the present example, a stainless steel pipe having an internal diameter of 0.13 mm and an external diameter of 0.40 mm was used for the first pipe for receiving an optical fiber. Further, two second pipes for inserting the first pipe therein were used. One of the second pipes had an internal diameter of 0.40 mm and an external diameter of 2.0 mm. The other had an internal diameter of 2.0 mm and an external diameter of 2.4 mm. Firstly, the first pipe and the three second pipes were combined with one another so as to form a connector main body. With this arrangement, the first pipe was securely placed at the center of the connector main body. After that, an optical fiber was inserted in the first pipe. Note that the first pipe and the second pipes were fixed to one another by a UV-hardened resin (ultraviolet-ray hardened resin) used as a resin material (adhesive agent).

Thereafter, an ultraviolet hardened resin MP-101 (hardened resin refractive index: 1.45, produced by Mitsubishi Rayon Co., Ltd.) was injected as the first resin into the resin injection portion of the optical fiber connector, and ultraviolet light was irradiated onto the first resin to harden the first resin. Next, an ultraviolet hardened resin UT1059 (hardened resin refractive index: 1.58, produced by Mitsubishi Rayon Co., Ltd.) was injected as the second resin on the first resin in order to form a pre-lens. Next, wavefront aberration of light transmitting through the pre-lens was measured with a Shack-Hartmann wavefront instrument. When the wavefront aberration got close to 0, ultraviolet light was irradiated to harden the second resin and produce a collimator lens of the optical fiber connector. The wavefront aberration of the collimator lens obtained was not more than 1.3λ (λ: 1.5 μm), and a lens length was 2.8 mm. Note that, there was substantially no difference between the wave front aberration of the unhardened collimator lens and the wave front aberration of the hardened collimator lens. Further, substantially no bubbles occurred when injecting the first resin and the second resin, or when hardening the resins.

Example 2

In the present example, a stainless steel pipe having an internal diameter of 0.13 mm and an external diameter of 0.35 mm was used as the first pipe for receiving an optical fiber inside. Further, four second pipes for inserting the first pipe therein were used. A first second pipe had an internal diameter 0.36 mm and an external diameter of 0.6 mm. A second one had an internal diameter of 0.6 mm and an external diameter of 0.75 mm. A third one had an internal diameter of 0.76 mm and an external diameter of 1.0 mm. A fourth one had an internal diameter of 1.0 mm and an external diameter of 2.3 mm. With this arrangement, the first pipe was securely placed at the center of the connector main body. After that, an optical fiber was inserted in the first pipe. Note that the first pipe and the second pipes were fixed to one another by a UV-hardened resin used as a resin material (adhesive agent).

Example 3

By using the ultraviolet hardening resin MP101 (hardened resin refractive index: 1.45, produced by Mitsubishi Rayon Co., Ltd.) as the first resin, a collimator lens for the optical fiber connector was produced in substantially the same way as in Example 1 except that the lens was made solely from the first resin. The collimator lens obtained had a lens length of 2.7 mm. Because of volume shrinkage, the lens length was 1.5% shorter as compared with the case in Example 1. Moreover, a wavefront aberration of the collimator lens obtained was about 0.5λ. Note that the wavefront aberration of the hardened collimator lens was about 2.5×. Further, when the first resin was hardened, a fewer bubbles were produced as compared with Example 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, according to the present invention, an optical fiber connector includes a connector main body made up of a first pipe for receiving an optical fiber inside, and a second pipe for receiving the first pipe inside. With this arrangement, the optical fiber can be securely held at the center of the connector main body with ease. Namely, the optical axis of the optical fiber can be accurately aligned. Accordingly, the arrangement can solve a problem of optical axis misalignment of the optical fiber. Therefore, coupling loss of the optical fiber connectors can be prevented. Further, accurate optical coupling without misaligned optical axis can be realized by only placing the optical fiber connector of the present invention on a groove (for example, V-groove).

The invention claimed is:

1. An optical fiber connector comprising:
   a connector main body including a first pipe for receiving an optical fiber inside, and a second pipe for receiving the first pipe inside; and
   a resin injection portion located at a front end of the optical fiber and having a first resin and a second resin formed therein, the first resin forming a lens body, and the second resin forming a lens surface; wherein
   the lens surface is formed by a weight of the second resin itself and a surface tension of the second resin, and
   the lens is shaped based on a positioning error of the optical fiber relative to an outer diameter of the connector.

2. The optical fiber connector as set forth in claim 1, wherein the connector main body is made of stainless steel.

3. The optical fiber connector as set forth in claim 1, wherein the lens is made from a plurality of resins having different refractive indexes.

4. The optical fiber connector as set forth in claim 3, wherein a resin with the largest refractive index among the plurality of resins defines the surface of the lens.

5. An optical coupling apparatus, comprising:
   a light source or optical information output means for outputting optical information;
   an optical fiber connector as set forth in claim 1 for optically coupling with emitted light from the light source or the optical information output means; and
   setting means having a groove for setting the optical fiber connector and the light source or the optical information output means thereon.

6. The optical fiber connector as set forth in claim 2, wherein the first and second resins have different refractive indexes.

7. The optical fiber connector as set forth in claim 6, wherein a resin with the largest refractive index among the first and second resins defines a surface of the lens.

8. An optical coupling apparatus, comprising:
   a light source or optical information output means for outputting optical information;
   an optical fiber connector as set forth in claim 2 for optically coupling with emitted light from the light source or the optical information output means; and
   setting means having a groove for setting the optical fiber connector and the light source or the optical information output means thereon.

9. An optical coupling apparatus, comprising:
   a light source or optical information output means for outputting optical information;

an optical fiber connector as set forth in claim 3 for optically coupling with emitted light from the light source or the optical information output means; and setting means having a groove for setting the optical fiber connector and the light source or the optical information output means thereon.

10. An optical coupling apparatus, comprising:

a light source or optical information output means for outputting optical information;

an optical fiber connector as set forth in claim 4 for optically coupling with emitted light from the light source or the optical information output means; and setting means having a groove for setting the optical fiber connector and the light source or the optical information output means thereon.

11. A method for manufacturing an optical fiber connector in which a lens is formed at a resin injection portion located at a front end of an optical fiber inserted in a connector main body, said method comprising:

a connector forming step of forming the connector main body by inserting a first pipe in a second pipe, wherein the first pipe receives the optical fiber inside, and the second pipe receives the first pipe inside;

a fiber inserting step of inserting the optical fiber in the first pipe of the connector main body formed in the connector forming step; and a lens forming step of forming a lens, including a lens body and a lens surface, by injecting a first resin to form the lens body, and a second resin to form the lens surface, at least one of the first and second resin being a light-hardened resin or a thermosetting resin.

12. The method as set forth in claim 11, wherein:

said lens forming step includes:

a first resin injecting and hardening step of injecting a first resin, made from a light-hardened resin or a thermosetting resin, into the resin injection portion, and hardening the first resin;

a second resin injecting step of injecting a second resin, made from a light-hardened resin or a thermosetting resin, onto the hardened first resin so as to form a pre-lens; and a second resin hardening step of hardening the second resin so as to form the lens.

13. The method as set forth in claim 12, wherein the second resin has a higher refractive index than the first resin.

14. The method as set forth in claim 12, wherein the first resin and the second resin are UV-hardened resins, and are hardened by irradiation of ultraviolet light.

15. The method as set forth in claim 12, wherein:

in said second resin hardening step, the wavefront aberration of light that has transmitted through the pre-lens is measured, wherein the lens is so shaped as to have a wavefront aberration of about 0, taking into account a positioning error of the optical fiber with respect to an outer diameter of the connector, and wherein a lens surface is formed by a weight and a surface tension of the second resin itself.

16. The method as set forth in claim 13, wherein the first resin and the second resin are UV-hardened resins, and are hardened by irradiation of ultraviolet light.

17. The method as set forth in claim 13, wherein:

in said second resin hardening step, the wavefront aberration of light that has transmitted through the pre-lens is measured, wherein the lens is so shaped as to have a wavefront aberration of about 0, taking into account a positioning error of the optical fiber with respect to an outer diameter of the connector, and wherein a lens surface is formed by a weight and a surface tension of the second resin itself.

18. The method as set forth in claim 14, wherein:

in said second resin hardening step, the wavefront aberration of light that has transmitted through the pre-lens is measured, wherein the lens is so shaped as to have a wavefront aberration of about 0, taking into account a positioning error of the optical fiber with respect to an outer diameter of the connector, and wherein a lens surface is formed by a weight and a surface tension of the second resin itself.

* * * * *